(12) United States Patent
Senjalia

(10) Patent No.: US 11,954,110 B2
(45) Date of Patent: Apr. 9, 2024

(54) METHODS AND APPARATUS FOR VISUALIZING ENTITY INSTANCE RELATIONSHIPS IN A DATABASE

(71) Applicant: Bhargav Senjalia, Dover, NJ (US)

(72) Inventor: Bhargav Senjalia, Dover, NJ (US)

(*) Notice: Subject to any disclaimer, the term of this patent is extended or adjusted under 35 U.S.C. 154(b) by 345 days.

(21) Appl. No.: 15/494,261

(22) Filed: Apr. 21, 2017

(65) Prior Publication Data

US 2017/0308538 A1 Oct. 26, 2017

Related U.S. Application Data

(60) Provisional application No. 62/327,197, filed on Apr. 25, 2016.

(51) Int. Cl.
| | | |
|---|---|---|
| *G06F 16/25* | (2019.01) | |
| *G06F 16/2455* | (2019.01) | |
| *G06F 16/28* | (2019.01) | |
| *G06Q 30/0601* | (2023.01) | |

(52) U.S. Cl.
CPC ........ *G06F 16/252* (2019.01); *G06F 16/2455* (2019.01); *G06Q 30/0641* (2013.01); *G06F 16/285* (2019.01)

(58) Field of Classification Search
CPC ............... G06F 16/252; G06F 16/2455; G06F 17/3056; G06F 17/30477; G06F 16/285; G06F 17/30598; G06Q 30/0641
See application file for complete search history.

(56) References Cited

U.S. PATENT DOCUMENTS

| | | | |
|---|---|---|---|
| 8,917,274 B2 * | 12/2014 | Ma | G06F 3/04847 |
| | | | 345/440 |
| 2008/0270458 A1 | 10/2008 | Gvelesiani | |
| 2012/0059861 A1 * | 3/2012 | Senjalia | G06F 16/24556 |
| | | | 707/803 |
| 2012/0117516 A1 | 5/2012 | Guinness | |
| 2014/0172850 A1 * | 6/2014 | Borkar | G06F 16/28 |
| | | | 707/736 |

(Continued)

OTHER PUBLICATIONS

Author Unknown, "Lesson 4: Using Permutations and Combinations to Compute Probabilities," NYS Common Core Mathematics Curriculum, Eureka Math, 2015, Great Minds, pp. 49-63.

(Continued)

*Primary Examiner* — Richard L Bowen
*Assistant Examiner* — Aryan D Toughiry
(74) *Attorney, Agent, or Firm* — Dority & Manning, P.A.

(57) ABSTRACT

A method, apparatus, and non-transitory computer-readable storage medium for presenting information identifying relationships in a database. Entity labels identifying a plurality of different entity types modeled in the database are presented in a user interface. Input identifying one or more selected entity types is received. A plurality of entity instance relationship sets is accessed. Each entity instance relationship set identifies a relationship between entity instances of at least two different entity types. Attribute data of the entity instances identified in only those entity instance relationship sets that identify a relationship between entity instances of the one or more selected entity types are presented, such that attribute data for each unique relationship between entity instances of the one or more selected entity types are presented only once.

19 Claims, 12 Drawing Sheets

(56) References Cited

U.S. PATENT DOCUMENTS

| | | | | |
|---|---|---|---|---|
| 2014/0379703 A1* | 12/2014 | Martin | ................ | G06F 16/2455 |
| | | | | 707/723 |
| 2015/0347413 A1* | 12/2015 | Brady | ................... | G06F 16/335 |
| | | | | 707/751 |
| 2019/0278789 A1 | 9/2019 | Senjalia | | |

OTHER PUBLICATIONS

Non-Final Office Action for U.S. Appl. No. 16/420,607, dated Sep. 22, 2021, 39 pages.

* cited by examiner

METHODS AND APPARATUS FOR VISUALIZING ENTITY INSTANCE RELATIONSHIPS IN A DATABASE

RELATED APPLICATION

This application claims the benefit of U.S. Provisional Application No. 62/327,197, filed on Apr. 25, 2016, entitled "TOOL FOR PRESENTING ENTITY-RELATIONSHIP DATA IN THE FORM OF A DIAGRAM," the disclosure of which is hereby incorporated herein by reference in its entirety.

TECHNICAL FIELD

Embodiments disclosed herein relate to data analysis and, in particular, to visualizing entity instance relationships maintained in a database.

BACKGROUND

Databases are used to store information, and are frequently organized based on an abstraction referred to as an "entity." Each entity models, or represents, a thing that is relatively distinct from another thing. One example is a retailer database, which may be organized based at least in part on a customer entity used to model, or represent, customers of the retailer; a product entity used to model products carried by the retailer; a vendor entity used to model vendors of the retailer; and a store entity used to model various physical retail locations (stores) of the retailer. Each entity typically has a relationship with one or more other entities. Obvious relationships among the above entities might include a relationship between customers and products, e.g., certain customers purchased certain products, and a relationship between vendors and products, e.g., particular products are supplied by certain vendors.

An entity, such as a customer entity, also typically defines attributes which contain data that describe or otherwise relate to the thing being modeled. For example, a customer entity may have a name attribute, an address attribute, and the like. The collection of attribute data that describes the actual thing being modeled is referred to as an instance of the entity, or, for shorthand, an entity instance. There may be many entity instances of each type of entity. Using the above example, the retailer database may include thousands of entity instances of the customer entity type, each entity instance including attribute data associated with a particular customer of the retailer. Typically, each entity instance will include at least one attribute that uniquely identifies a particular entity instance of a particular entity type from every other entity instance of the same entity type. For example, each customer entity instance may include a unique identifier attribute that uniquely identifies a particular customer.

There are frequently relationships among entity instances of different entity types in a database, some of which may be relatively obvious, and some less so. For example, a particular customer entity instance has a relationship with a particular product entity instance if the customer represented by the customer entity instance purchased the product represented by the particular product entity instance. This information may be valuable to the retailer because it provides the retailer with potentially useful information about the customer, such as the fact that the customer may be a country music fan if the product is a country music CD. The particular product entity instance is also related to a particular store entity instance by virtue of the fact that the product was sold by a particular store of the retailer. Note that this latter relationship actually further establishes a relationship between the particular customer entity instance and the particular store entity instance in that the particular customer purchased the country music CD from the particular store. Knowing that the particular customer shops at a particular store may also be useful to the retailer. Consequently, it is not unusual for a database owner to want to know what relationships exist among the entity instances in a database.

Typically, when an individual wants a report identifying the entity instances which are related to one another, another individual—typically a person skilled in the particular database technology used to store the data—must develop a specialized program which extracts this information from the database that contains the entity instances. This can be a time-consuming and expensive process, and requires access to individuals with specialized database skills. Moreover, the resulting software is tailored to generating a report about particular entity types. If a different report that provides information about different entity types is desired, another specialized program must be developed. Often, such reports are textual and may present information in a manner that is not intuitive or easily interpreted by a human. Accordingly, there is a need for a mechanism that can provide information about relationships between entity instances in a database that does not require modification for each different desired report, and that visualizes information identifying the relationships between the entity instances in the database in a manner that is intuitive and easily interpreted by a human.

SUMMARY

Embodiments disclosed herein relate to visualizing information that identifies relationships between different types of things modeled, or represented, in a database. In one embodiment, a computing device is provided. The computing device includes a communication interface adapted to communicate with a network and includes a processor device coupled to the communication interface. The processor device is configured to access a data table that identifies, for a group of entity structures, relationships between entity instances contained in the group of entity structures, each such relationship identified in a row of the data table, each row containing a plurality of fields, each field in each row corresponding to a different entity structure in the group of entity structures, each field being empty or being non-empty and containing an entity instance identifier of the entity structure to which the field corresponds. The processor device is further configured to generate, in a user interface, imagery that depicts a plurality of objects, each object corresponding to a different entity structure of the group of entity structures, each object partially overlapping each other object to form a plurality of overlapping areas and non-overlapping areas. For each entity structure in the group of entity structures, the processor device is further configured to determine a unique number of entity instances of the entity structure identified in the data table and present the unique number of entity instances of the entity structure in the user interface in association with the object that corresponds to the respective entity structure.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first subset" and "second subset," and does not imply a priority, a type, an importance, or other attribute, unless otherwise stated herein.

As used herein and in the claims, the articles "a" and "an" in reference to an element refers to "one or more" of the element unless otherwise explicitly specified.

Embodiments disclosed herein relate to visualizing information that identifies relationships between different types of things modeled, or represented, in a database. The embodiments result in an intuitive user interface that visually depicts relationships between entity instances of entity structures. For purposes of illustration, embodiments will be illustrated in the context of a relational database, but the embodiments are not limited to any particular form of database. As used herein, the term "database" refers to any data structure suitable for retaining information, such as a file, a spreadsheet, a database management system, or the like.

Figure 1:
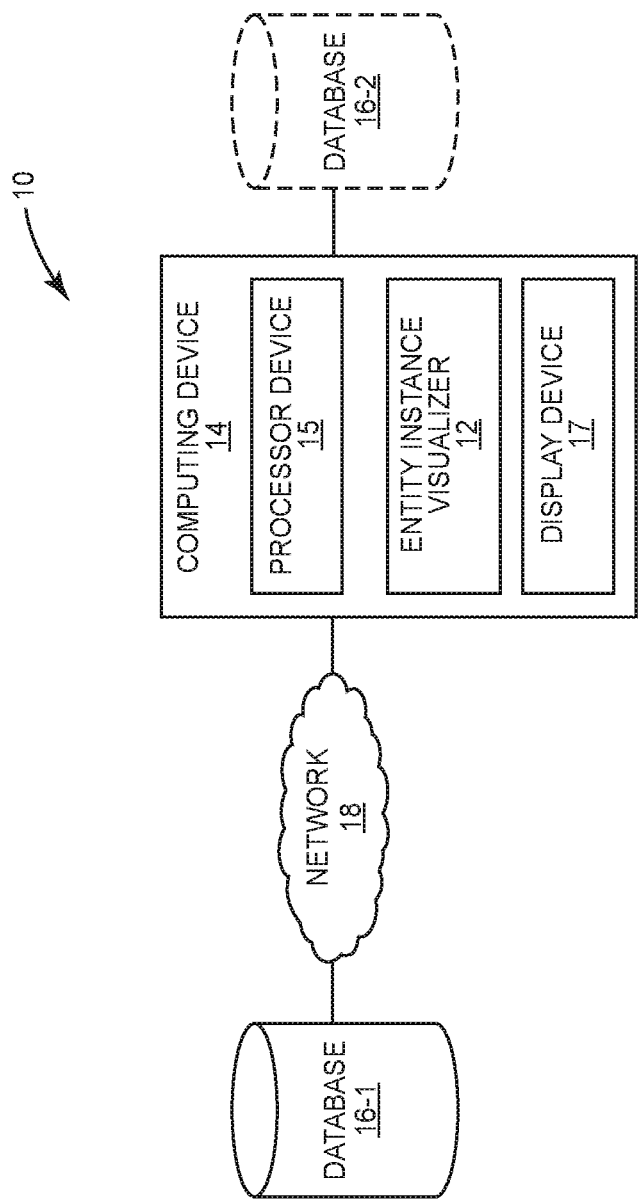
FIG. 1 is a block diagram of an example system in which embodiments may be practiced.

FIG. 1 is a block diagram of an example system 10 in which embodiments may be practiced. The system 10 includes an entity instance visualizer 12 that executes on a computing device 14, such as a computer. The computing device 14 includes a processor device 15 and a display device 17. In one embodiment, the entity instance visualizer 12 accesses information associated with a database 16-1 that is coupled to a network 18. Alternately, the entity instance visualizer 12 may access information associated with a locally connected database 16-2, as illustrated in dashed outline in FIG. 1.

Generally, as discussed in greater detail with reference to the subsequent figures, the entity instance visualizer 12 accesses information in a data table that identifies relationships between particular entity instances of the database 16-1, and based on this information, and in response to user input, presents information on the display device 17 that identifies relationships between entity instances of different entity types. The entity instance visualizer 12 can present such information based on any suitable data table, and need not be modified, altered, tested, debugged, or re-compiled to do so. Rather, in conjunction with the data table, the entity instance visualizer 12 provides a highly intuitive and flexible mechanism that enables a user to rapidly ascertain how information stored in the database 16-1 is related. Knowledge of such relationships may be used in any of a number of different applications, such as for advertising, marketing, or any other endeavor in which such knowledge would be useful. Because the entity instance visualizer 12 is a component of the computing device 14, functionality implemented by the entity instance visualizer 12 may be attributed to the computing device 14 generally. Moreover, in examples where the entity instance visualizer 12 comprises software instructions that program the processor device 15 to carry out functionality discussed herein, functionality implemented by the entity instance visualizer 12 may be attributed herein to the processor device 15.

Figure 2:
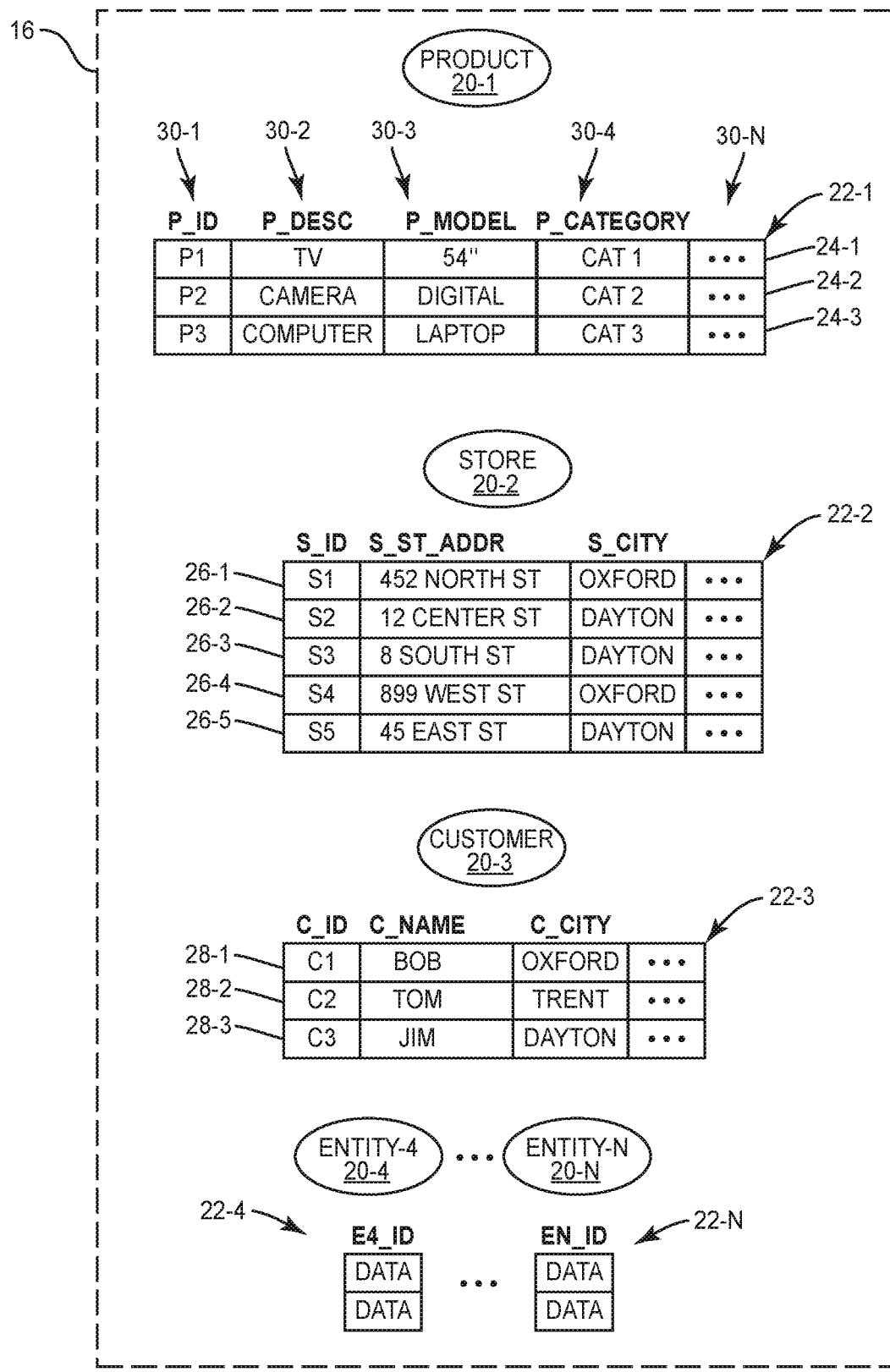
FIG. 2 is a block diagram illustrating aspects of an example database.

Prior to delving into the details of the operation of the entity instance visualizer 12, background and terminology relating to databases will be discussed to provide context for the subsequent discussion. FIG. 2 is a block diagram illustrating aspects of an example database 16. The database 16 models, or represents, a plurality of entities 20-1-20-N (generally, entities 20). Each entity 20 is of a particular entity type. In database terminology, an entity is an abstraction that represents a discrete thing (although not necessarily a physical thing) in a particular context. For example, in the database 16, the entities 20-1-20-3 represent, respectively, products, stores, and customers in a product retailer context. Entities 20-4-20-N may represent any other distinct things that may be useful in the product retailer context, and are illustrated to emphasize that while for purposes of illustration, the embodiments will be disclosed in the context of relationships among the three entities 20-1-20-3, the embodiments are not limited to any particular number of entities 20, and may be used to analyze the relationships among any number of different types of entities 20. The use of ellipses throughout the Figures indicates the presence of zero or more additional elements that may be present, but for purposes of clarity and brevity, are not illustrated.

Abstract entities 20-1-20-N are implemented in tangible form in the database 16 via corresponding entity structures 22-1-22-N (generally, entity structures 22). An entity structure 22 may be implemented in any desired format; however, for purposes of illustration, the entity structures 22 will be described as having a tabular format with one or more rows of information and one or more columns of information. Each row in an entity structure 22 represents an entity instance of that particular entity 20. Each entity instance corresponds to a particular one, or instance, of the thing being modeled by that particular entity 20, and is of the entity type of that particular entity 20.

For example, the entity structure 22-1 contains three entity instances 24-1-24-3 (generally, entity instances 24), each of which corresponds to a particular (different) product, and thus, each of which is a product-type entity instance 24. The entity structure 22-2 contains five entity instances 26-1-26-5 (generally, entity instances 26), each of which corresponds to a particular (different) store, and thus, each of which is a store-type entity instance 26. The entity structure 22-3 contains three entity instances 28-1-28-3 (generally, entity instances 28), each of which corresponds to a particular (different) customer, and thus, each of which is a customer-type entity instance 28. While each entity structure 22 is shown, for purposes of illustration, as having a relatively small number of entity instances, it should be apparent that in practice, one or more of the entity structures 22 may have thousands, or hundreds of thousands, of entity instances. For example, a large retailer may have hundreds of thousands, or millions, of different customers, and thus the entity structure 22-3 may have a corresponding number of entity instances 28.

Entity instances comprise data that describe the thing being modeled, or represented. Such data are categorized into different entity attributes, sometimes referred to herein as fields, with each entity attribute being associated with different data. With respect to an entity structure 22, entity attribute data about an entity are typically illustrated in a columnar fashion. Each entity attribute typically has an attribute name, or label. The entity attribute names are preferably indicative of the information, or data, stored in the entity attribute of a particular instance of the entity. Referring to the entity structure 22-1, for example, entity attribute names include "P_ID," which is the name of an entity attribute whose attribute data contain a unique identifier that uniquely identifies the product that corresponds to the particular entity instance 24; "P_DESC," which is the name of an entity attribute whose attribute data contain the description of the product corresponding to the particular entity instance 24; "P_MODEL," which is the name of an entity attribute whose attribute data contain the model of the product corresponding to the particular entity instance 24; and "P_CATEGORY," which is the name of the entity attribute whose attribute data contain the product category of the product corresponding to the particular entity instance 24.

The attribute data associated with the respective entity attribute are illustrated in corresponding columns 30-1-30-N of the entity structure 22-1. Thus, the attribute data associated with the entity attribute P_ID of entity instance 24-1 is "P01," the attribute data associated with the entity attribute P_DESC is "TV," the attribute data associated with the entity attribute P_MODEL is 54", and the attribute data associated with the entity attribute P_CATEGORY is "CAT 1."

In a similar fashion, the entity structures 22-2-22-N include one or more entity instances, each of which contains entity attribute data associated with that particular entity type. Each of the entity instances of the entity structures 22-1-22-4 includes, among other entity attributes, an entity attribute that uniquely identifies that entity instance from any other entity instance of that particular entity type. As mentioned previously, the unique entity attribute for the product entity type is the P_ID attribute. Thus, the P_ID attribute data of each entity instance 24 is unique. Similarly, the store entity 20-2 includes an "S_ID" attribute whose data uniquely identify store entity instances, and the customer entity 20-3 includes a "C_ID" attribute whose data uniquely identify customer entity instances. Such unique entity attributes will be referred to herein as entity instance identifiers.

For purposes of illustration and clarity, a reference to an entity instance or an entity structure 22 may be preceded by the particular entity type of the entity instance or entity structure 22 hereinafter. For example, the entity structure 22-1 may be referred to as the product entity structure 22-1, and an entity instance stored in the product entity structure 22-1 may be referred to as a product entity instance 24.

For purposes of illustration and clarity, references may be made herein from time to time to entity instances of an entity 20. Any such reference means that the entity instance is of the type of entity 20, and the actual attribute data that define the entity instance are maintained in a corresponding entity structure 22. For example, a reference to an entity instance of the product entity 20-1 means that the entity instance corresponds to a particular product, and the attribute data that define the particular entity instance are stored in the entity structure 22-1.

Entity instances of one entity structure 22 may have relationships with entity instances of another entity structure 22. Some relationships among entity instances may be relatively obvious, and others, less so. For example, a customer entity instance 28 of the customer entity structure 22-3 has a relationship with a particular product entity instance 24 of the product entity structure 22-1 if the customer corresponding to the customer entity instance 28 purchased the product corresponding to the particular product entity instance 24. This information may be valuable to the retailer because it may provide the retailer with potentially useful information about the customer, such as the fact that the customer may be a country music fan if the product is a country music CD. The particular product entity instance 24 is also related to a particular store entity instance 26 of the store entity structure 22-2 by virtue of the fact that the product was sold by the particular store that corresponds to that store entity instance 26. Notably, this latter relationship actually suggests a relationship between the particular customer entity instance 28 and the particular store entity instance 26 in that the particular customer purchased the country music CD from the particular store.

Understanding the relationships among entity instances can be valuable. For example, a retailer may be able to send specific and highly relevant offers to a particular customer if the retailer knows that the customer shops at a particular retailer location, or purchases particular categories of products. Consequently, it is not unusual for a database user to want to know what relationships exist among the entity instances in a database.

Determining relationships among entity instances may be relatively simple where a database models only a few types of entities. However, in practice, databases may model hundreds of different types of entities. Determining all the relationships among entity instances of hundreds of different entity structures 22 may be quite time-consuming, and once determined, writing the software reporting application(s) necessary to extract the data from the entity structures 22 in accordance with the determined relationships is also time-consuming and may be expensive.

Figure 3:
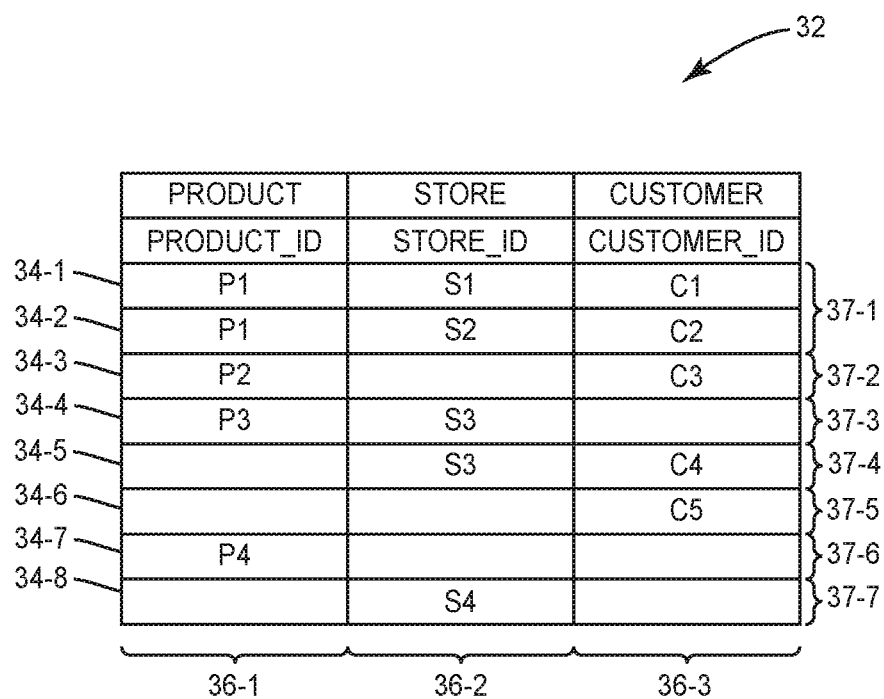
FIG. 3 illustrates a data table according to one embodiment.

FIG. 3 illustrates a data table 32 according to one embodiment. The data table 32 identifies, for a group of entity structures 22, relationships between entity instances contained in the group of entity structures 22. In this example, the data table 32 identifies, for the group of entity structures 22-1-22-3, relationships between entity instances 24, entity instances 26, and entity instances 28 contained in the entity structures 22-1-22-3, respectively. Each such relationship is identified in a row 34-1-34-8 (generally, rows 34) of the data table 32. Each row 34 contains a plurality of fields 36-1-36-3, each field 36-1-36-3 in each row 34 corresponding to a different one of the entity structures 22-1-22-3 in the group of entity structures 22. In this example, the field 36-1 of each row 34 corresponds to the entity structure 22-1, the field 36-2 of each row 34 corresponds to the entity structure 22-2, and the field 36-3 of each row 34 corresponds to the entity structure 22-3. The fields 36 may be empty, or may be non-empty and contain an entity instance identifier of the entity structure 22 with which the field 36 corresponds.

As an example, the field 36-3 of the row 34-1 is non-empty and contains an entity instance identifier C1, which identifies the entity instance 28-1 contained in the entity structure 22-3. The field 36-1 of the row 34-1 is non-empty and contains an entity instance identifier P1, which identifies the entity instance 24-1 contained in the entity structure 22-1, and the field 36-2 of the row 34-1 is non-empty and contains an entity instance identifier S1, which identifies the entity instance 26-1 contained in the entity structure 22-2. The row 34-1 thus establishes a relationship between the entity instances 28-1, 24-1, and 26-1. As another example, the field 36-3 of the row 34-8 is empty. The field 36-1 of the row 34-8 is empty, and the field 36-2 of the row 34-8 is non-empty and contains an entity instance identifier S4, which identifies the entity instance 26-4 contained in the entity structure 22-2. The row 34-8 thus indicates that there is no relationship between the entity instance 26-4 and any entity instance contained in the entity structures 22-1 or 22-3. As will be discussed in greater detail below, in one embodiment, the rows 34 may be analyzed to identify a plurality of subsets 37-1-37-7 (generally, subsets 37), wherein each subset 37 corresponds to a different combination of non-empty fields 36.

The data table 32 may be generated in any desirable manner. In one example, the data table 32 may comprise a table in the database 16-1 that may be populated automatically as the relationships identified in the rows 34 become known. For example, when a customer purchases a product at a store, a sales system may automatically populate the data table 32 with a row 34 identifying a relationship between the customer, the product, and the store. In other embodiments, a user, or an executing process, may issue one or more query commands, such as SQL commands, against the entity structures 22-1-22-3 to form the data table 32. Note that the data table 32 does not contain duplicate rows 34. In particular, no row 34 contains the same non-empty fields as any other row 34. Also, no row 34 is a subset of any other row 34.

Figure 4:
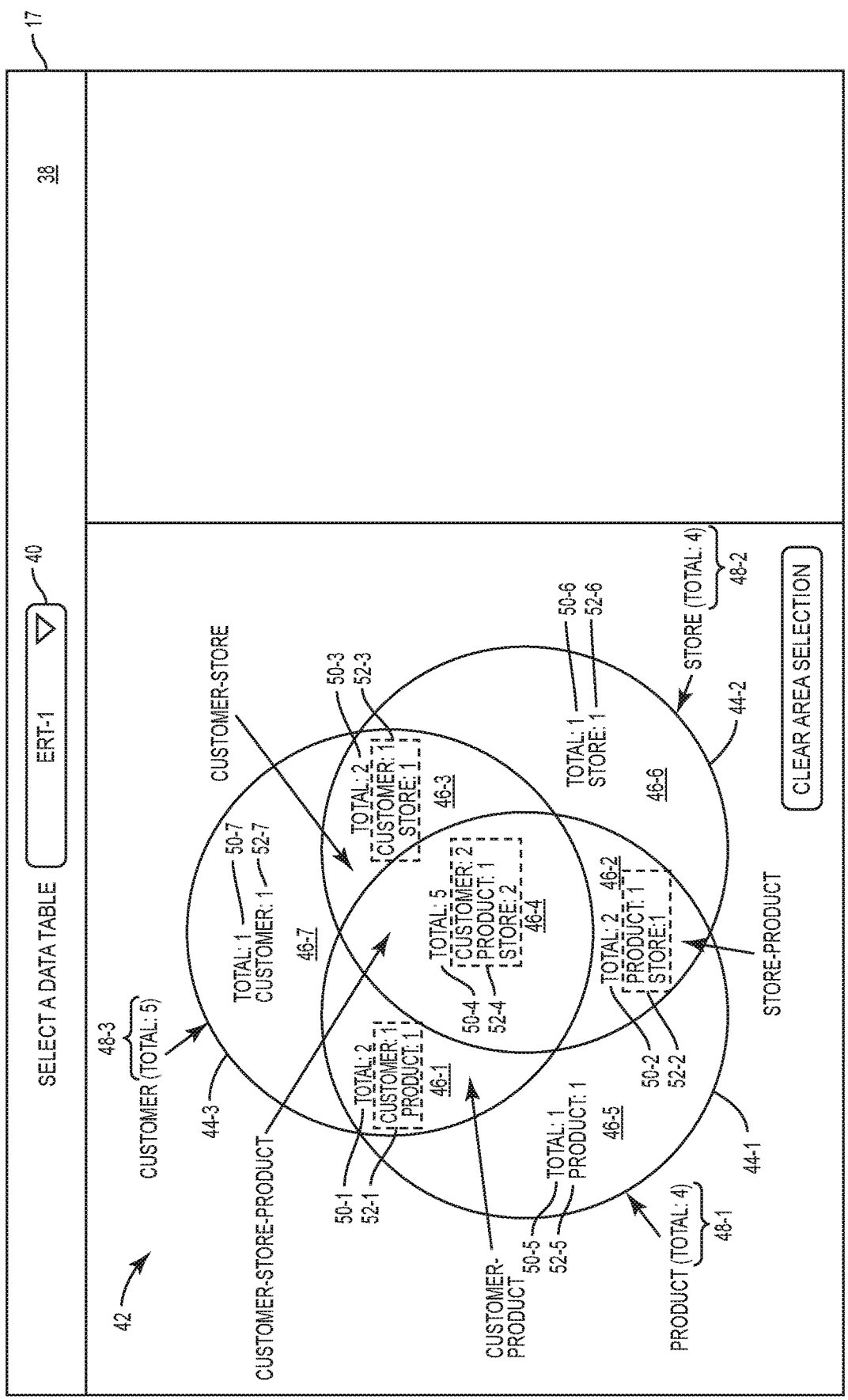
FIG. 4 illustrates an example user interface that may be presented on a display device according to one example.

FIG. 4 illustrates an example user interface 38 that may be presented on the display device 17 according to one example. In this example, the user interface 38 includes a data table selection control 40 that allows a user to select a particular data table. In this example, assume that the user selects the data table 32 illustrated in FIG. 3, referred to in FIG. 4 as "ERT-1". The entity instance visualizer 12 accesses the data table 32. The entity instance visualizer 12 generates, in the user interface 38, imagery 42 that depicts a plurality of objects 44-1-44-3 (generally, objects 44), each object 44 corresponding to a different entity structure 22, and each object 44 partially overlapping each other object 44 to form a plurality of overlapping areas 46-1-46-4 and non-overlapping areas 46-5-46-7. While for purposes of illustration the objects 44 are circles, the embodiments are not limited to circles and can be any shape or shapes that allow the depiction of overlapping and non-overlapping areas.

For each entity structure 22 in the group of entity structures 22-1-22-3, the entity instance visualizer 12 determines a unique number of entity instances of the entity structure 22 identified in the data table 32. The entity instance visualizer 12 may determine this information by summing the number of unique entity instance identifiers in the fields 36 of the data table 32. Thus, for the entity structure 22-1, the entity instance visualizer 12 determines that there are four unique entity instance identifiers P1, P2, P3, and P4 contained in the fields 36-1 of the rows 34-1-34-8. For the entity structure 22-2, the entity instance visualizer 12 determines that there are four unique entity instance identifiers S1, S2, S3, and S4 contained in the fields 36-2 of the rows 34-1-34-8. For the entity structure 22-3, the entity instance visualizer 12 determines that there are five unique entity instance identifiers C1, C2, C3, C4, and C5 contained in the fields 36-3 of the rows 34-1-34-8.

The entity instance visualizer 12 presents the unique number of entity instances for each entity structure 22 in the user interface 38 in association with the object 44 that corresponds to the respective entity structure 22. In this example, the entity instance visualizer 12 presents data 48-1 in association with the object 44-1 that indicates there are four unique entity instances 24 in the data table 32, data 48-2 in association with the object 44-2 that indicates there are four unique entity instances 26 in the data table 32, and data 48-3 in association with the object 44-3 that indicates there are five unique entity instances 28 in the data table 32.

Figure 5:
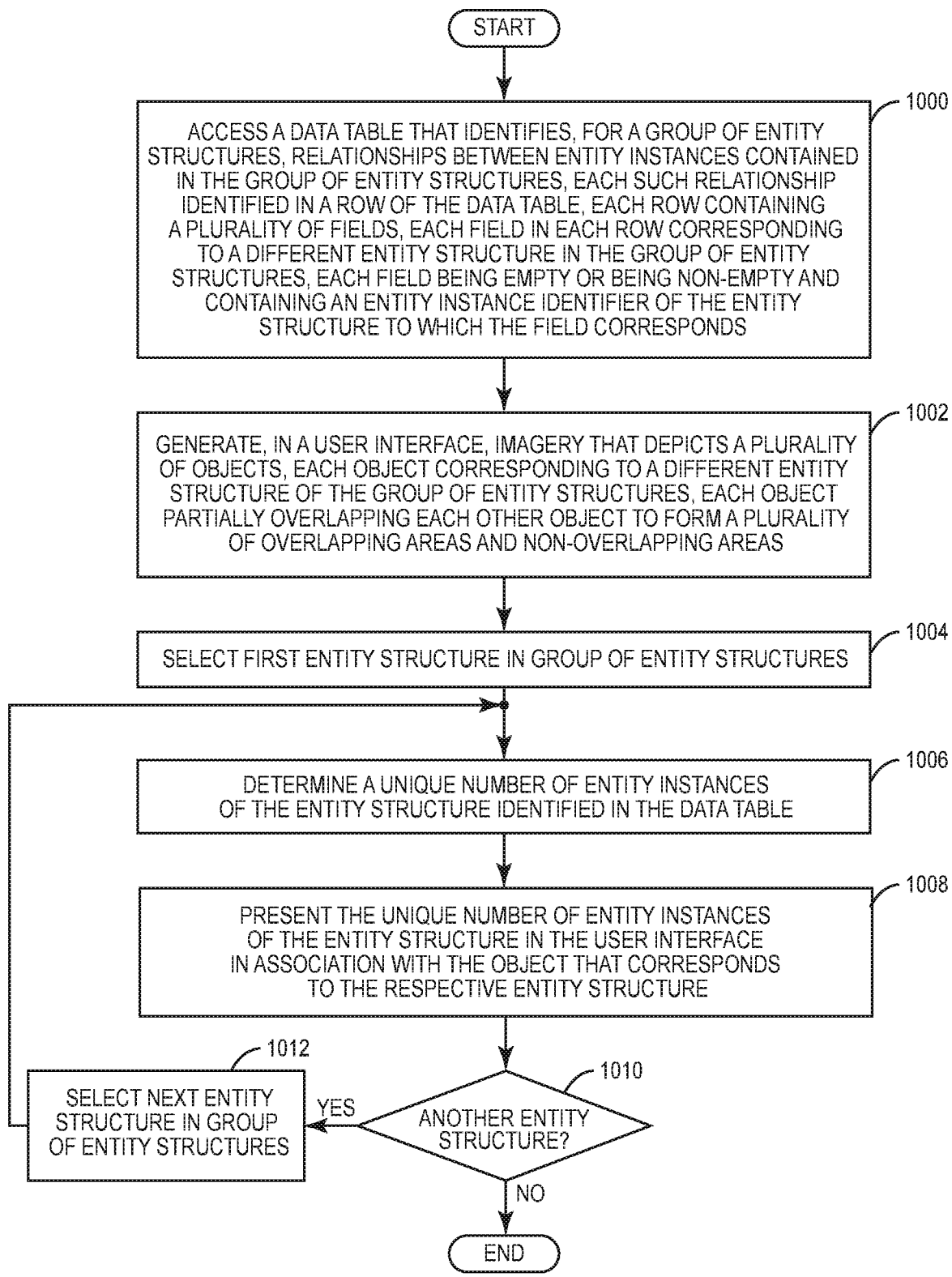
FIG. 5 is a flowchart of a method for visualizing entity instance relationships according to one embodiment.

FIG. 5 is a flowchart of a method for visualizing entity instance relationships according to one embodiment. FIG. 5 will be discussed in conjunction with FIG. 4. The entity instance visualizer 12 accesses the data table 32 that identifies, for the group of entity structures 22-1-22-3, relationships between entity instances contained in the group of entity structures 22-1-22-3, each such relationship identified in a row 34 of the data table 32, each row 34 containing a plurality of fields 36-1-36-3, each field 36-1-36-3 in each row 34 corresponding to a different entity structure 22 in the group of entity structures 22, each field 36 being empty or being non-empty and containing an entity instance identifier of the entity structure 22 to which the field 36 corresponds (FIG. 5, block 1000).

The entity instance visualizer 12 generates, in the user interface 38, the imagery 42 that depicts the plurality of objects 44, each object 44 corresponding to a different entity structure 22 of the group of entity structures 22, each object 44 partially overlapping each other object 44 to form the plurality of overlapping areas 46-1-46-4 and non-overlapping areas 46-5-46-7 (FIG. 5, block 1002).

The entity instance visualizer 12 selects a first entity structure 22 in the group of entity structures 22, such as the entity structure 22-1 (FIG. 5, block 1004). The entity instance visualizer 12 determines a unique number of entity instances of the entity structure 22-1 identified in the data table 32 (FIG. 5, block 1006). The entity instance visualizer 12 presents the data 48-1 that identifies the unique number of entity instances for the entity structure 22-1 in the user interface 38 in association with the object 44-1 that corresponds to the entity structure 22-1 (FIG. 5, block 1008). The entity instance visualizer 12 repeats this process for the entity structures 22-2-22-3 (FIG. 5, blocks 1010, 1012, 1006, and 1008).

Referring again to FIG. 4, the entity instance visualizer 12 may also identify the plurality of subsets 37 of the rows 34 of the data table 32, wherein each subset 37 corresponds to a different combination of non-empty fields 36. Each subset 37 includes those rows 34 of the data table 32 that have the corresponding combination of non-empty fields 36. For example, the subset 37-1 contains the rows 34-1 and 34-2, each of which contains zero non-empty fields 36. The subset 37-2 contains the row 34-3, which contains two non-empty fields 36-1 and 36-3, and one empty field 36-2. The subset 37-3 contains the row 34-4, which contains two non-empty fields 36-1 and 36-2 and one empty field 36-3. The subset 37-4 contains the row 34-5, which contains two non-empty fields 36-2 and 36-3 and one empty field 36-1. The subset 37-5 contains the row 34-6, which contains one non-empty field 36-3 and two empty fields 36-1 and 36-2. The subset 37-6 contains the row 34-7, which contains one non-empty field 36-1 and two empty fields 36-3 and 36-2. The subset 37-7 contains the row 34-8, which contains one non-empty field 36-2 and two empty fields 36-1 and 36-3.

Each subset 37 corresponds to one of the overlapping areas 46-1-46-4, or to one of the non-overlapping areas 46-5-46-7 based on the particular combination of non-empty fields 36 associated with the subset 37. For example, the subset 37-1 corresponds to the combination of zero non-empty fields 36, which means that each row 34 in the subset 37-1 contains an entity instance identifier contained in the customer entity structure 22-3 (field 36-3), an entity instance identifier contained in the product entity structure 22-1 (field 36-1), and an entity instance identifier contained in the store entity structure 22-2 (field 36-2). The subset 37-1 thus corresponds to the overlapping area 46-4, which is the overlapping area of the objects 44-1-44-3, which corresponds to the entity structures 22-1-22-3 respectively.

The subset 37-2 corresponds to the combination of non-empty fields 36-3 and 36-1, which means that each row 34 in the subset 37-2 contains an entity instance identifier contained in the customer entity structure 22-3 (field 36-3), an entity instance identifier contained in the product entity structure 22-1 (field 36-1), and no entity instance identifier contained in the store entity structure 22-2 (field 36-2). The subset 37-2 thus corresponds to the overlapping area 46-1, which is the overlapping area of the objects 44-1 and 44-3, which correspond to the entity structures 22-1 and 22-3, respectively.

The subset 37-3 corresponds to the combination of non-empty fields 36-1 and 36-2, which means that each row 34 in the subset 37-3 contains an entity instance identifier contained in the product entity structure 22-1 (field 36-1) and an entity instance identifier contained in the store entity structure 22-2 (field 36-2), and no entity instance identifier contained in the customer entity structure 22-3 (field 36-3). The subset 37-3 thus corresponds to the overlapping area 46-2, which is the overlapping area of the objects 44-1 and 44-2, which corresponds to the entity structures 22-1 and 22-2, respectively.

The subset 37-4 corresponds to the combination of non-empty fields 36-3 and 36-2, which means that each row 34 in the subset 37-4 contains an entity instance identifier contained in the customer entity structure 22-3 (field 36-3) and an entity instance identifier contained in the store entity structure 22-2 (field 36-2), and no entity instance identifier contained in the product entity structure 22-1 (field 36-1). The subset 37-4 thus corresponds to the overlapping area 46-3, which is the overlapping area of the objects 44-2 and 44-3, which corresponds to the entity structures 22-2 and 22-3, respectively.

The subset 37-5 corresponds to the combination of non-empty fields 36-3, which means that each row 34 in the subset 37-5 contains an entity instance identifier contained in the customer entity structure 22-3 (field 36-3) and no entity instance identifiers contained in the store entity structure 22-2 (field 36-2) or the product entity structure 22-1 (field 36-1). The subset 37-5 thus corresponds to the non-overlapping area 46-7, which is the non-overlapping area of the object 44-3, which corresponds to the entity structure 22-3.

The subset 37-6 corresponds to the combination of non-empty fields 36-1, which means that each row 34 in the subset 37-6 contains an entity instance identifier contained in the product entity structure 22-1 (field 36-1), and no entity instance identifiers contained in the customer entity structure 22-3 (field 36-3) or the store entity structure 22-2 (field 36-2). The subset 37-6 thus corresponds to the non-overlapping area 46-5, which is the non-overlapping area of the object 44-1, which corresponds to the entity structure 22-1.

The subset 37-7 corresponds to the combination of non-empty fields 36-2, which means that each row 34 in the subset 37-7 contains an entity instance identifier contained in the store entity structure 22-2 (field 36-2), and no entity instance identifiers contained in the customer entity structure 22-3 (field 36-3) or the product entity structure 22-1 (field 36-1). The subset 37-7 thus corresponds to the non-overlapping area 46-6, which is the non-overlapping area of the object 44-2, which corresponds to the entity structure 22-2.

In some embodiments, the entity instance visualizer 12 presents data 50-1-50-7 that identifies the total number of unique entity instances associated with each overlapping area 46-1-46-4 and non-overlapping area 46-5-46-7. For example, the data 50-1 indicates that there are two unique entity instances associated with the overlapping area 46-1. As another example, the data 50-4 indicates that there are five unique entity instances associated with the overlapping area 46-4.

Figure 6:
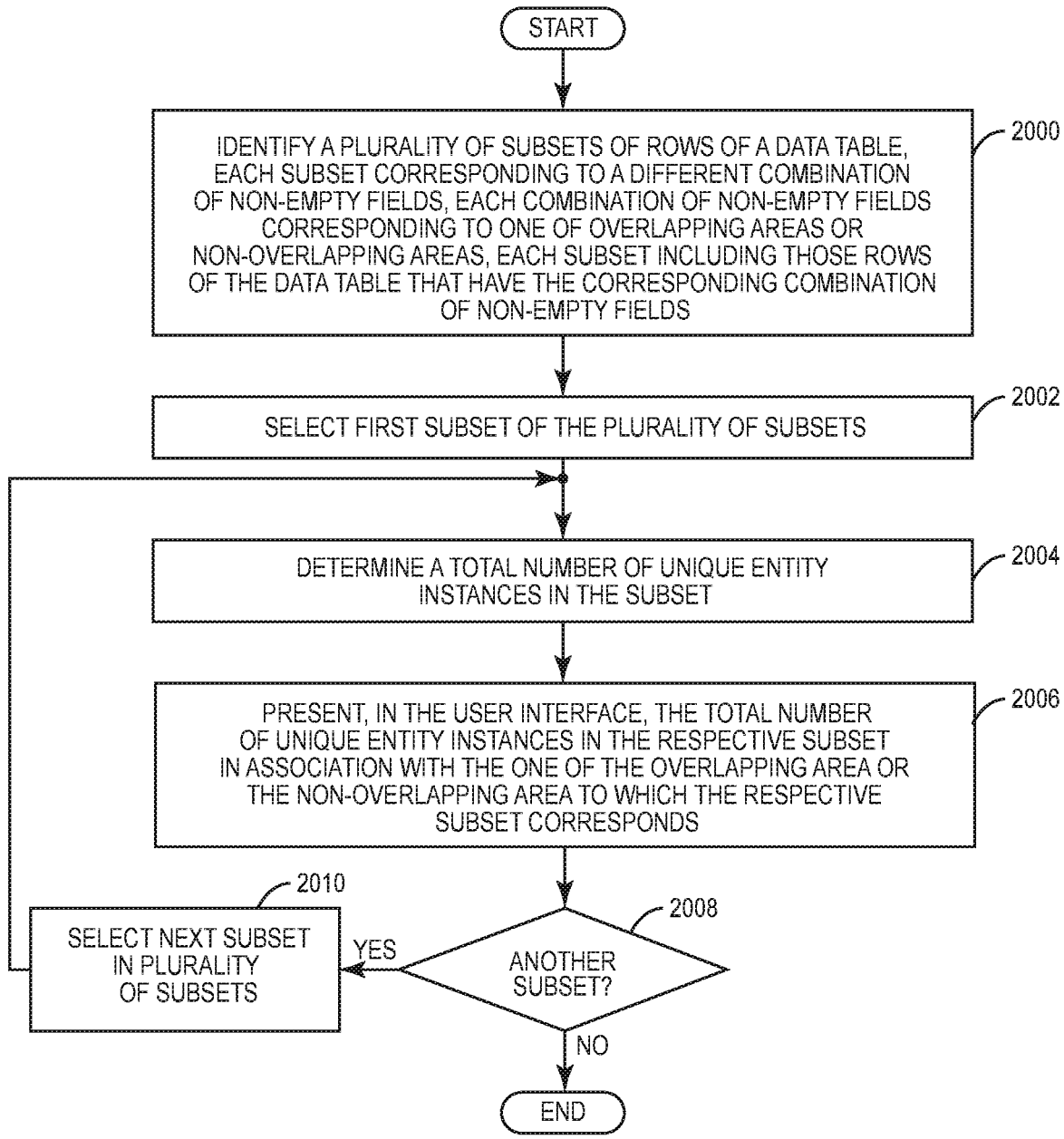
FIG. 6 is a flowchart of a method for determining and presenting data that identifies a total number of unique entity instances associated with an overlapping or non-overlapping area depicted in a user interface according to one embodiment.

FIG. 6 is a flowchart of a method for determining and presenting the data 50-1-50-7 in the user interface 38 according to one embodiment. FIG. 6 will be discussed in conjunction with FIGS. 3 and 4. The entity instance visualizer 12 processes the data table 32 and identifies the plurality of subsets 37-1-37-7 of the rows 34 of the data table 32, wherein each subset 37 corresponds to a different combination of non-empty fields 36, and each combination of non-empty fields 36 corresponds to one of the overlapping areas 46-1-46-4 or the non-overlapping areas 46-5-46-7. Each subset 37 includes those rows 34 of the data table 32 that have the corresponding combination of non-empty fields 36 (FIG. 6, block 2000).

The entity instance visualizer 12 then determines, for a first subset 37, a total number of unique entity instances in the subset 37 (FIG. 6, blocks 2002-2004). For example, with regard to the subset 37-1, the entity instance visualizer 12 processes the rows 34-1 and 34-2 and determines that there are five unique entity instance identifiers (P1, S1, S2, C1, C2) that identify five entity instances.

The entity instance visualizer 12 presents, in the user interface 38, for the subset 37-1, the data 50-4 that identifies the total number of unique entity instances in the subset 37-1 in association with the overlapping area 46-4 to which the subset 37-1 corresponds (FIG. 6, block 2006). The entity instance visualizer 12 repeats this process for the subsets 37-2-37-7 (FIG. 6, blocks 2008, 2010, 2004, and 2006).

In some embodiments, the entity instance visualizer 12 also presents data 52-1-52-7 that identifies the total number of unique entity instances for each entity structure that is associated with each overlapping area 46-1-46-4 and non-overlapping area 46-5-46-7. For example, the data 52-1 indicates that for the overlapping area 46-1, there is a total of one unique entity instance contained in the entity structure 22-3 (customer), and a total of one unique entity instance contained in the entity structure 22-1 (product). As another example, the data 52-4 indicates that for the overlapping area 46-4, there are a total of two unique entity instances contained in the entity structure 22-3 (customer), a total of one unique entity instance contained in the entity structure 22-1 (product), and a total of two unique entity instances contained in the entity structure 22-2 (store).

Figure 7:
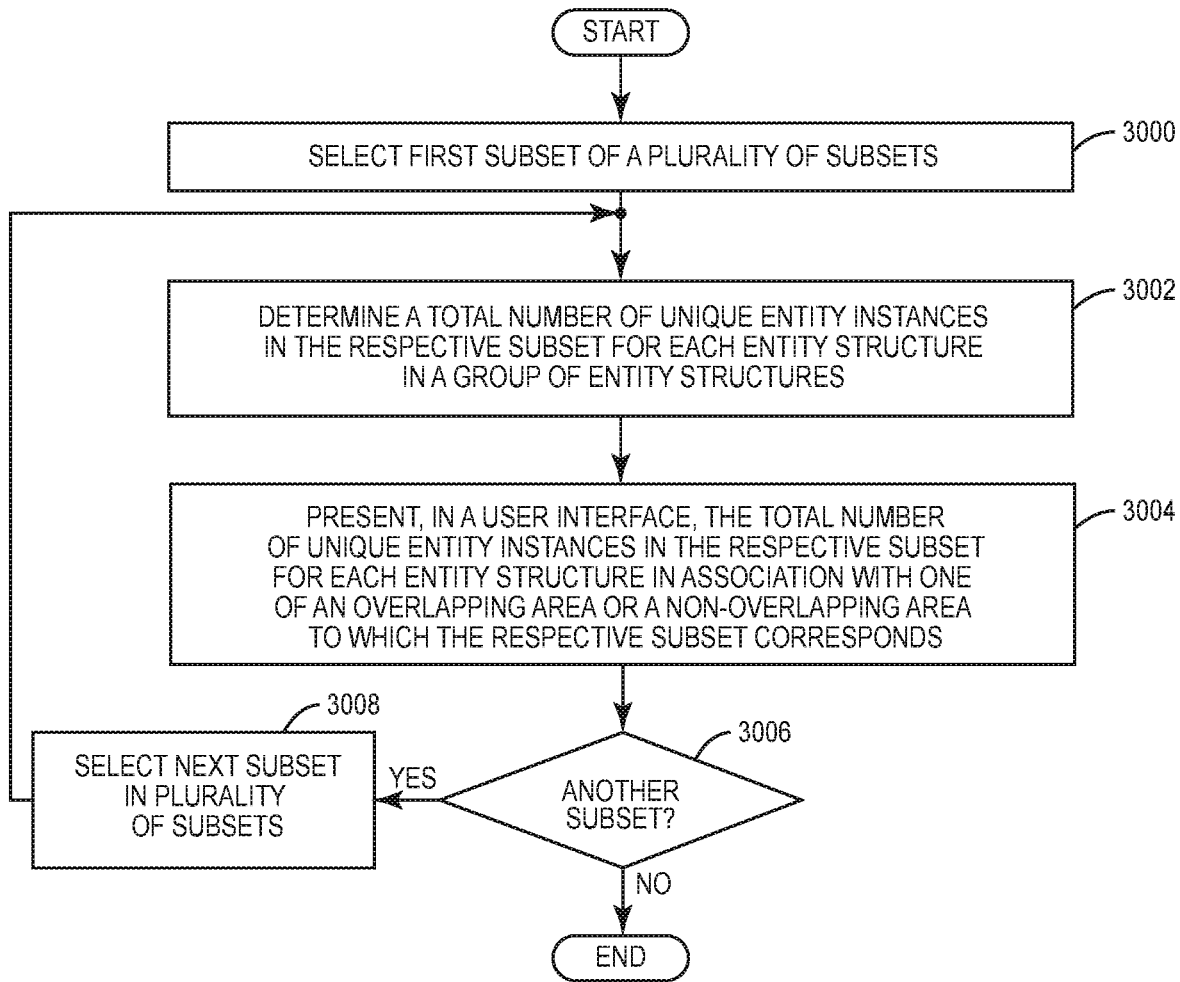
FIG. 7 is a flowchart of a method for determining and presenting data that identifies a total number of unique entity instances for each entity structure associated with an overlapping or non-overlapping area depicted in the user interface according to one embodiment.

FIG. 7 is a flowchart of a method for determining and presenting the data 52-1-52-7 in the user interface 38 according to one embodiment. FIG. 7 will be discussed in conjunction with FIGS. 3 and 4. The entity instance visualizer 12 determines, for a first subset 37, a total number of unique entity instances in the subset 37 for each entity structure 22 in the group of entity structures 22 (FIG. 7, blocks 3000-3002). For example, with regard to the subset 37-1, the entity instance visualizer 12 processes the rows 34-1 and 34-2 and determines that there is one unique entity instance (P1) associated with the entity structure 22-1 (product), two unique entity instances (S1, S2) associated with the entity structure 22-2 (product), and two unique entity instances (C1, C2) associated with the entity structure 22-3.

The entity instance visualizer 12 presents, in the user interface 38, for the subset 37-1, the data 52-4 that identifies the total number of unique entity instances in the subset 37-1 for each entity structure 22 in association with the overlapping area 46-4 to which the subset 37-1 corresponds (FIG. 7, block 3004). The entity instance visualizer 12 repeats this process for the subsets 37-2-37-7 (FIG. 7, blocks 3006, 3008, 3002, 3004).

Figure 8:
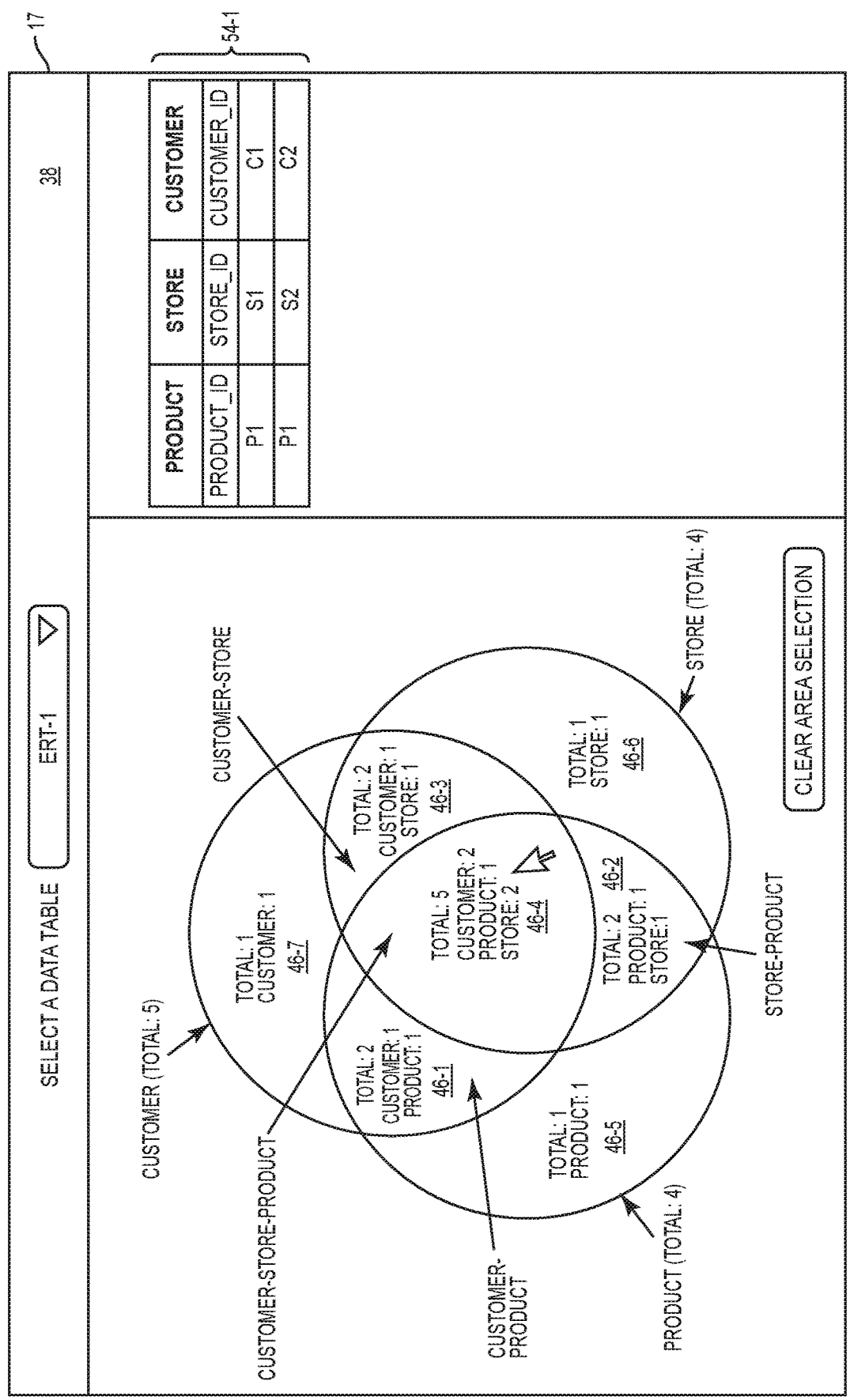
FIG. 8 is a diagram that illustrates interactive aspects of a user interface, according to one embodiment.

FIG. 8 is a diagram that illustrates interactive aspects of the user interface 38, according to one embodiment. In this example, a user may use an input device, such as a mouse, keyboard, or the like to select a particular overlapping area 46-1-46-4 or non-overlapping area 46-5-46-7. Upon selection of one or more overlapping areas 46-1-46-4 or non-overlapping areas 46-5-46-7, the entity instance visualizer 12 accesses the subset 37 of the rows 34 associated with the selected overlapping areas 46-1-46-4 or non-overlapping areas 46-5-46-7. For example, assume that a user using an input device, such as a mouse, selects the overlapping area 46-4. The entity instance visualizer 12 receives, via the input device, the selection of the overlapping area 46-4. The entity instance visualizer 12 identifies the subset 37-1 of the rows 34-1, 34-2 associated with the overlapping area 46-4. The entity instance visualizer 12 then presents, in the user interface 38 data 54-1 that depicts the subset 37-1 of the rows 34-1, 34-2 associated with the overlapping area 46-4. As illustrated in FIG. 8, the data 54-1 may also include one or more header rows that identify the names of the fields 36-1-36-3, and the names of the entity structures 22-1-22-3 associated with the overlapping area 46-4.

Figure 9:
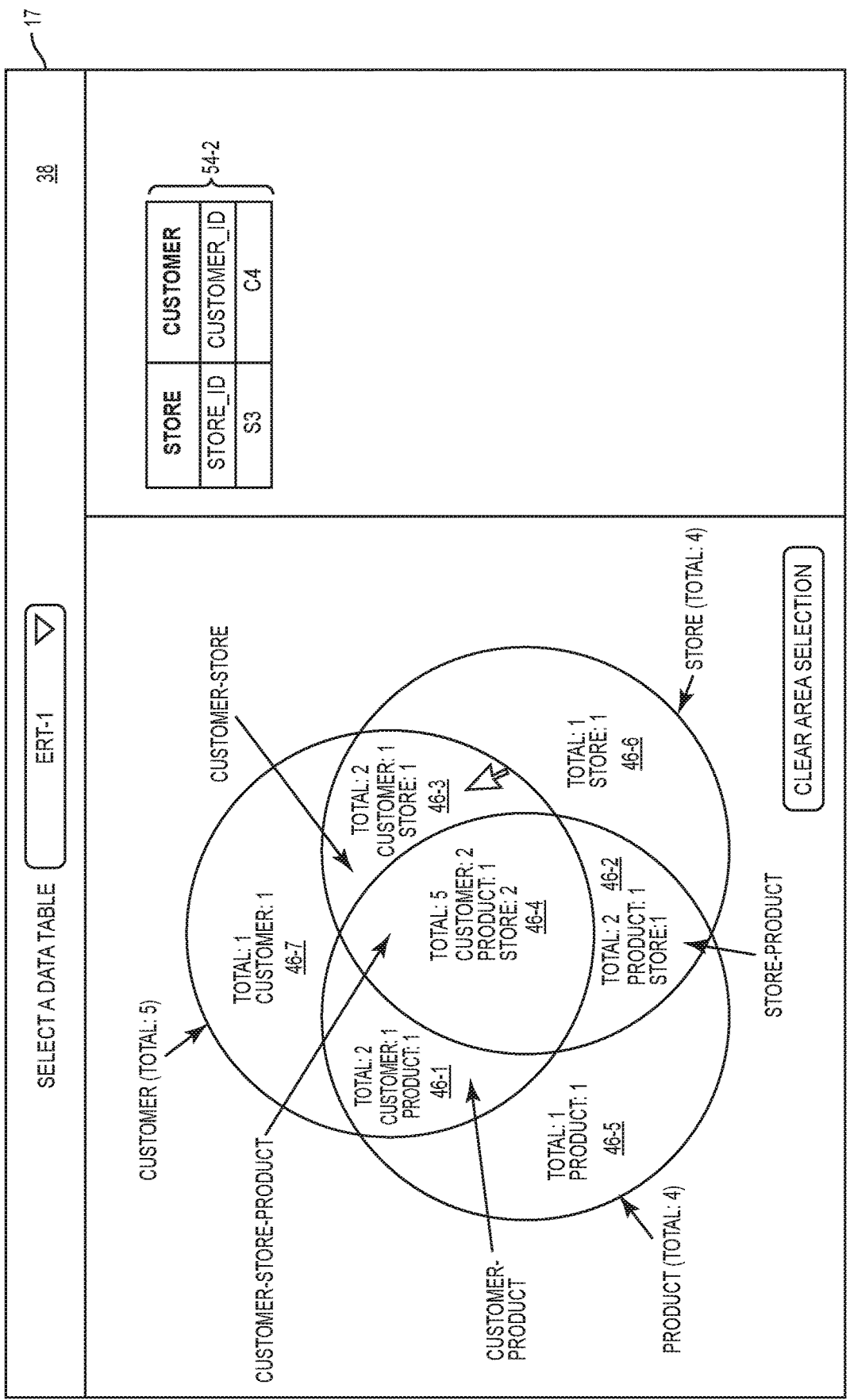
FIG. 9 is a diagram that illustrates additional interactive aspects of the user interface, according to one embodiment.

FIG. 9 is a diagram that illustrates additional interactive aspects of the user interface 38, according to one embodiment. In this example, assume that a user using an input device, such as a mouse, selects the overlapping area 46-3. The entity instance visualizer 12 receives, via the input device, the selection of the overlapping area 46-3. The entity instance visualizer 12 identifies the subset 37-4 of the row 34-5 associated with the overlapping area 46-3. The entity instance visualizer 12 then presents, in the user interface 38 data 54-2 that depicts the subset 37-4 of the row 34-5 associated with the overlapping area 46-3. As illustrated in FIG. 9, the data 54-2 may also include one or more header rows that identify the names of the fields 36-2-36-3, and the names of the entity structures 22-2-22-3 associated with the overlapping area 46-3.

Figure 10:
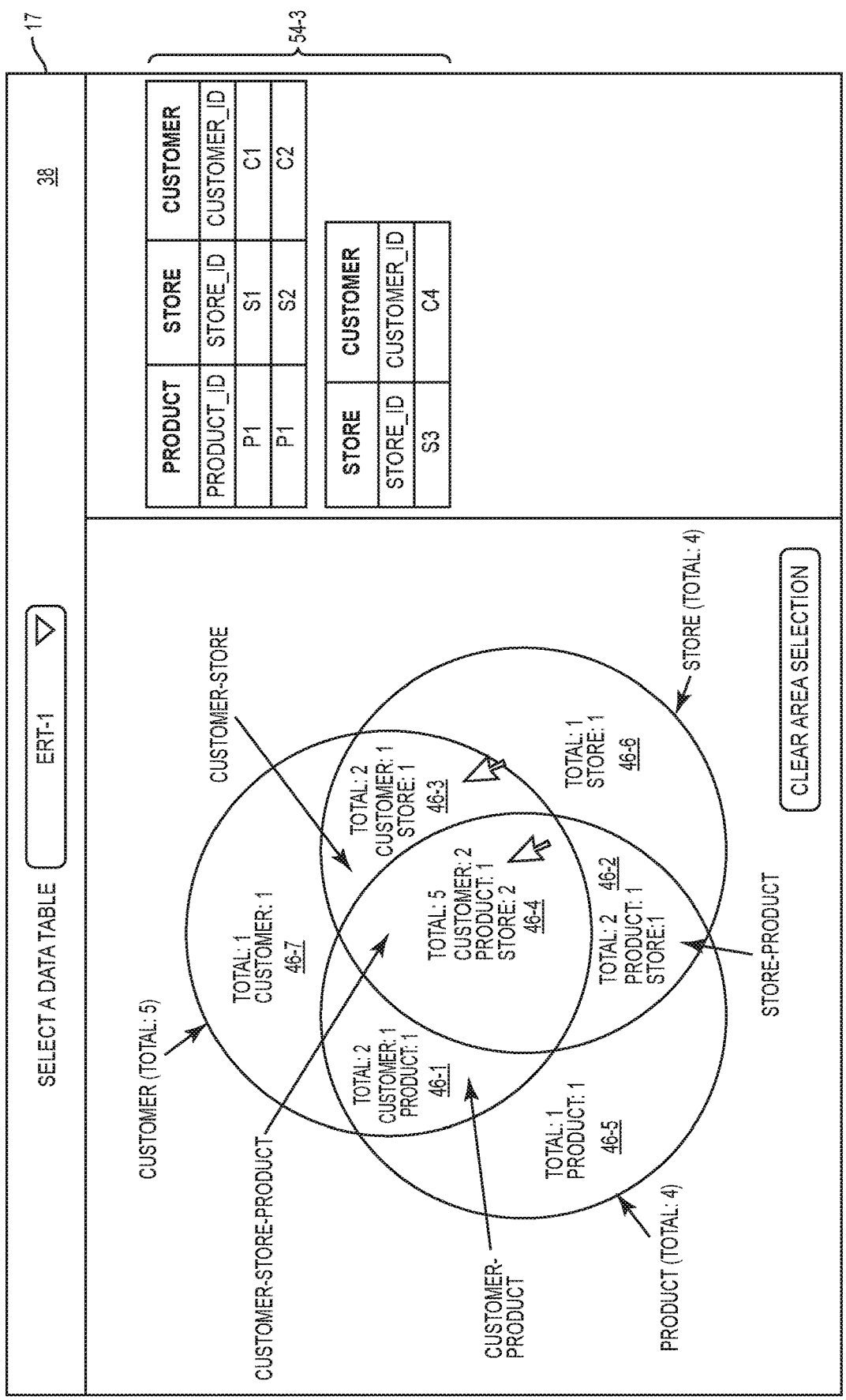
FIG. 10 is a diagram that illustrates additional interactive aspects of the user interface, according to one embodiment.

FIG. 10 is a diagram that illustrates additional interactive aspects of the user interface 38, according to one embodiment. In this example, assume that a user using an input device, such as a mouse, selects multiple overlapping areas 46-3 and 46-4. This may be implemented in any desired manner, such as by holding down a CTRL key of a keyboard while selecting each of the overlapping areas 46-3 and 46-4. The entity instance visualizer 12 receives, via the input device, the selection of the overlapping areas 46-3 and 46-4. The entity instance visualizer 12 identifies the subsets 37-1 and 37-4 as being associated with the overlapping areas 46-3 and 46-4, respectively. The entity instance visualizer 12 then presents, in the user interface 38, data 54-3 that depicts the subset 37-4 and the subset 37-1. As illustrated in FIG. 10, the data 54-3 may also include one or more header rows that identify the names of the fields 36-1-36-3 and the names of the entity structures 22-1-22-3, as appropriate, in conjunction with the subset 37-4 and the subset 37-1.

Figure 11:
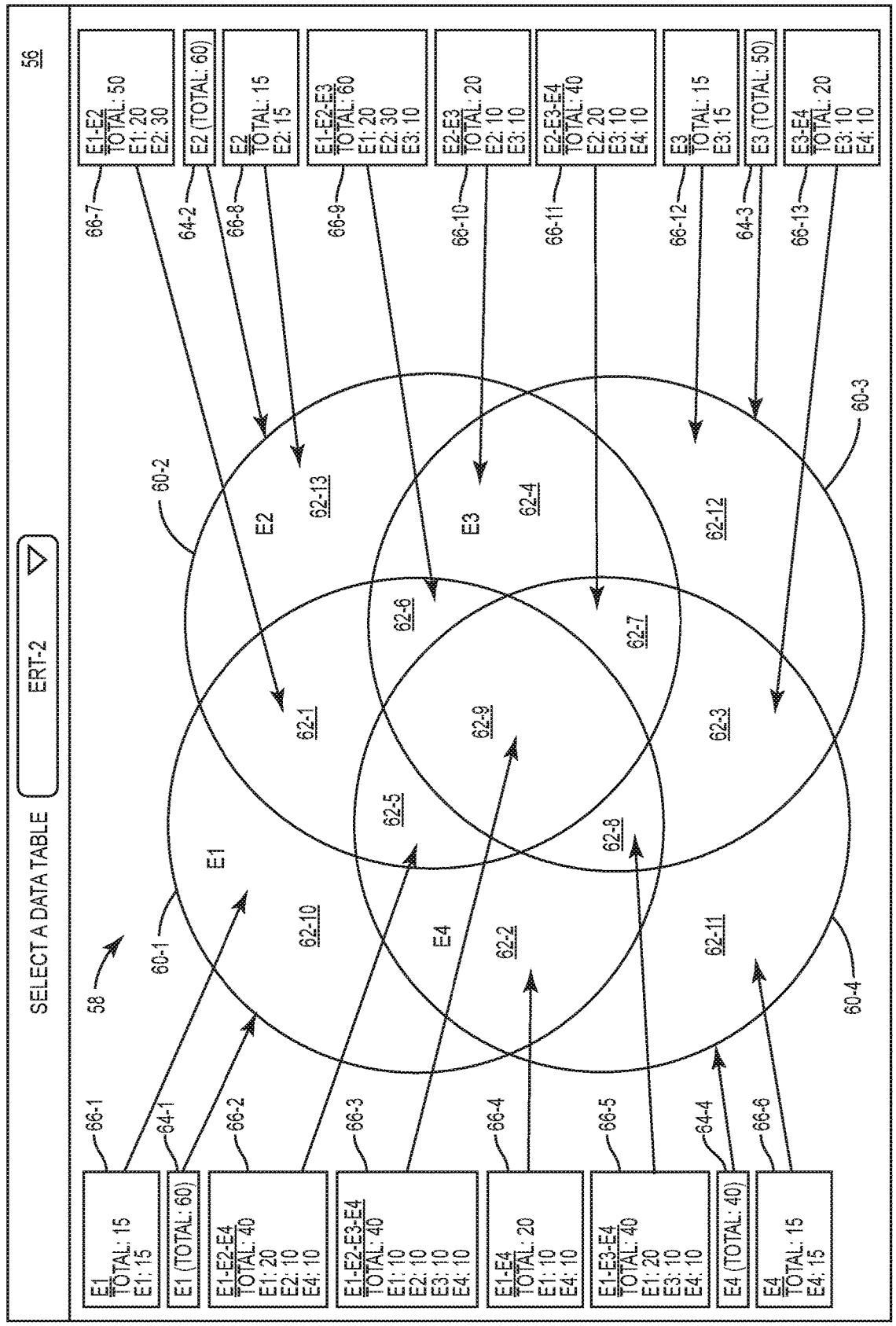
FIG. 11 illustrates a user interface according to another embodiment.

FIG. 11 illustrates a user interface 56 according to another embodiment. In this example, a data table identifies, for a group of four entity structures entitled E1, E2, E3, and E4, relationships between entity instances contained in the group of four entity structures, wherein each such relationship is identified in a row of the data table. Each row contains a plurality of fields, each field in each row corresponding to a different one of the four entity structures in the group of four entity structures, and each field being empty or being non-empty and containing an entity instance identifier of the entity structure to which the field corresponds.

Based on the data table, and in accordance with the flowchart illustrated in FIG. 5, the entity instance visualizer 12 generates, in the user interface 56, imagery 58 that depicts a plurality of objects 60-1-60-4, each object 60 corresponding to a different entity structure of the group of entity structures, each object 60 partially overlapping each other object 60 to form a plurality of overlapping areas 62-1-62-9 and non-overlapping areas 62-10-62-13. For each entity structure in the group of entity structures, the entity instance visualizer 12 determines a unique number of entity instances of the entity structure identified in the data table, and presents data 64-1-64-4 that identifies the unique number of entity instances for each entity structure in the user interface 56 in association with the object 60 that corresponds to the respective entity structure.

Based on the data table, and in accordance with the flowcharts illustrated in FIGS. 6 and 7, the entity instance visualizer 12 also identifies a plurality of subsets of rows of the data table, wherein each subset corresponds to a different combination of non-empty fields, and wherein each combination of non-empty fields corresponds to one of the overlapping areas 62-1-62-9 or non-overlapping areas 62-10-62-13. The entity instance visualizer 12 generates and presents data 66-1-66-13, which identifies the total number of unique entity instances in the respective subset in association with the one of the overlapping areas 62-1-62-9 or non-overlapping areas 62-10-62-13 with which the respective subset corresponds. The data 66-1-66-13 may also identify the total number of unique entity instances in the respective subset for each entity structure in association with the one of the overlapping area or the non-overlapping area to which the respective subset corresponds.

Figure 12:
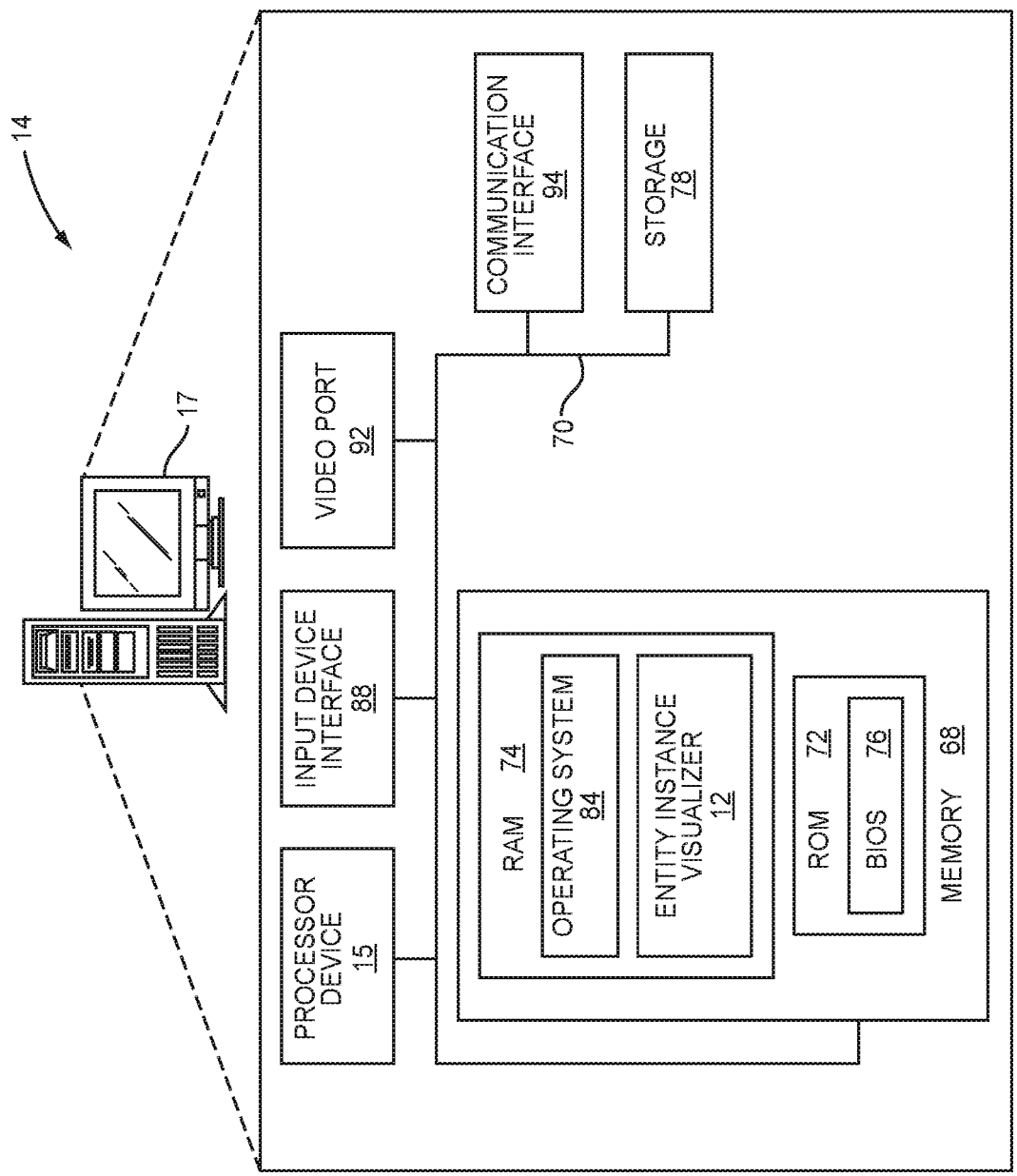
FIG. 12 illustrates an example computing device according to one embodiment.

FIG. 12 illustrates the example computing device 14 (FIG. 1) according to one embodiment. The computing device 14 may comprise, for example, a laptop computer, a desktop computer, a workstation, a proprietary mainframe computer, or the like. Alternately, the computing device 14 may comprise a special purpose computing device wherein the special purpose is to provide the functionality described herein. The computing device 14 may include the processor device 15; a system memory 68; and a system bus 70. The system bus 70 provides an interface for system components including, but not limited to, the system memory 68 and the processor device 15. The processor device 15 can be any of various commercially available or proprietary processors. Dual microprocessors and other multi-processor architectures may also be employed as the processor device 15.

The system bus 70 may be any of several types of bus structures that may further interconnect to a memory bus (with or without a memory controller), a peripheral bus, and/or a local bus using any of a variety of commercially available bus architectures. The system memory 68 may include non-volatile memory 72 (e.g., read only memory (ROM), erasable programmable read only memory (EPROM), electrically erasable programmable read only memory (EEPROM), etc.) and/or volatile memory 74 (e.g., random access memory (RAM)). A basic input/output system (BIOS) 76 may be stored in the non-volatile memory 72, and can include the basic routines that help to transfer information between elements within the computing device 14. The volatile memory 74 may also include a high-speed RAM such as static RAM for caching data.

The computing device 14 may further include a computer-readable storage 78, which may comprise, for example, an internal hard disk drive (HDD) (e.g., enhanced integrated drive electronics (EIDE) or serial advanced technology attachment (SATA)) for storage, flash memory, or the like. The database 16 (FIG. 2) may be stored in the computer-readable storage 78, for example. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the computer-readable storage 78 and in the volatile memory 74, including an operating system 84 and one or more program modules, such as the entity instance visualizer 12, which may implement the functionality described herein in whole or in part, and other processing and functionality described herein. It is to be appreciated that the embodiments can be implemented with various commercially available operating systems 84 or combinations of operating systems 84.

All or a portion of the embodiments may be implemented as a computer program product stored on a non-transitory computer-usable or computer-readable medium, such as the computer-readable storage 78, and including instructions configured to cause the processor device 15 to carry out the steps described herein. Thus, the computer-readable program code can comprise software instructions for implementing the functionality of the embodiments described herein when executed on the processor device 15. The processor device 15, in conjunction with the entity instance visualizer 12 in the volatile memory 74, may serve as a control system for the computing device 14 that is configured to, or adapted to, implement the functionality described herein.

Alternately, all or a portion of the entity instance visualizer 12 may be implemented in hardware, such as in a special-purpose database processor designed specifically to implement the functionality discussed herein.

An administrator or user may be able to enter commands and information into the computing device 14 through one or more input devices, such as, for example, a touch sensitive display (not illustrated); a keyboard (not illustrated); or a pointing device, such as a mouse (not illustrated). Other input devices (not illustrated) may include a microphone, an infrared (IR) remote control, a joystick, a game pad, a stylus pen, or the like. These and other input devices may be connected to the processor device 15 through an input device interface 88 that is coupled to the system bus 70, but can be connected by other interfaces such as a parallel port, an IEEE 13114 serial port, a game port, a universal serial bus (USB) port, an IR interface, etc.

The computing device 14 may drive a separate or integral display device 17, which may also be connected to the system bus 70 via an interface, such as a video port 92. The computing device 14 preferably includes a communication interface 94 for communicating with the network 18 (FIG. 1), which may comprise, for example a wireless LAN or wireless personal area network technology, including, for example, Wi-Fi®, Bluetooth®, or ZigBee®.

Those skilled in the art will recognize improvements and modifications to the preferred embodiments of the disclosure. All such improvements and modifications are considered within the scope of the concepts disclosed herein and the claims that follow.

What is claimed is:

1. A method comprising:

accessing, by a computing device comprising a processor device, a data table that identifies, for a group of entity structures, relationships between entity instances contained in the group of entity structures, each such relationship identified in a row of the data table, each row containing a plurality of fields, each field in each row corresponding to a different entity structure in the group of entity structures, each field being empty or being non-empty and containing an entity instance identifier of the entity structure to which the field corresponds;

generating, in a user interface, imagery that depicts a plurality of objects, each object corresponding to a different entity structure of the group of entity structures, each object having a corresponding defined perimeter, wherein the defined perimeter of each object intersects the defined perimeters of each other object to form a plurality of overlapping areas and non-overlapping areas; and for each entity structure in the group of entity structures:
determining a unique number of entity instances of the entity structure identified in the data table; and
presenting the unique number of entity instances of the entity structure in the user interface in association with a non-overlapping area of the object that corresponds to the respective entity structure.

2. The method of claim 1 further comprising:
identifying a plurality of subsets of rows of the data table, each subset of rows corresponding to a different combination of non-empty fields, each combination of non-empty fields corresponding to one of the overlapping areas or the non-overlapping areas, each subset of rows including those rows of the data table that have the corresponding combination of non-empty fields;
determining, for each subset of rows of the plurality of subsets of rows, a total number of unique entity instances in the subset of rows; and
presenting, in the user interface, for each subset of rows of the plurality of subsets of rows, the total number of unique entity instances in the respective subset of rows in association with the one of the overlapping area or the non-overlapping area to which the respective subset of rows corresponds.

3. The method of claim 2 wherein the group of entity structures comprises at least three entity structures.

4. The method of claim 2 further comprising:
determining, for each subset of rows of the plurality of subsets of rows, a total number of unique entity instances in the respective subset of rows for each entity structure in the group of entity structures; and
presenting, in the user interface, for each subset of rows of the plurality of subsets of rows, the total number of unique entity instances in the respective subset of rows for each entity structure in association with the one of the overlapping area or the non-overlapping area to which the respective subset of rows corresponds.

5. The method of claim 2 further comprising:
receiving, via an input device, a selection of a particular overlapping area or non-overlapping area;
identifying the subset of rows associated with the particular overlapping area or non-overlapping area; and
in response to the selection, presenting, in the user interface, the subset of rows associated with the particular overlapping area or non-overlapping area.

6. The method of claim 1 further comprising generating the data table that identifies, for the group of entity structures, relationships between the entity instances contained in the group of entity structures.

7. The method of claim 1 wherein the objects are circles.

8. The method of claim 1 wherein a first overlapping area of the plurality of overlapping areas identifies the overlap of two objects, and a second overlapping area of the plurality of overlapping areas identifies the overlap of three objects, and further comprising:
determining, for the first overlapping area, a first subset of rows of the data table that have non-empty fields that correspond to the two objects and empty fields that correspond to each other object of the plurality of objects;
determining a total number of unique entity instances in the first subset of rows;
presenting, in the user interface, the total number of unique entity instances in the first subset of rows in association with the first overlapping area;
determining, for the second overlapping area, a second subset of rows of the data table that have non-empty fields that correspond to the three objects and empty fields that correspond to each other object of the plurality of objects;
determining a total number of unique entity instances in the second subset of rows; and
presenting, in the user interface, the total number of unique entity instances in the second subset of rows in association with the second overlapping area.

9. A computing device comprising:
a communication interface adapted to communicate with a network; and
a processor device coupled to the communication interface, and configured to:
access a data table that identifies, for a group of entity structures, relationships between entity instances contained in the group of entity structures, each such relationship identified in a row of the data table, each row containing a plurality of fields, each field in each row corresponding to a different entity structure in the group of entity structures, each field being empty or being non-empty and containing an entity instance identifier of the entity structure to which the field corresponds;
generate, in a user interface, imagery that depicts a plurality of objects, each object corresponding to a different entity structure of the group of entity structures, each object having a corresponding defined perimeter, wherein the defined perimeter of each object intersects the defined perimeters of each other object to form a plurality of overlapping areas and non-overlapping areas; and
for each entity structure in the group of entity structures:
determine a unique number of entity instances of the entity structure identified in the data table; and
present the unique number of entity instances of the entity structure in the user interface in association with a non-overlapping area of the object that corresponds to the respective entity structure.

10. The computing device of claim 9 wherein the processor device is further configured to:
identify a plurality of subsets of rows of the data table, each subset of rows corresponding to a different combination of non-empty fields, each combination of non-empty fields corresponding to one of the overlapping areas or the non-overlapping areas, each subset of rows including those rows of the data table that have the corresponding combination of non-empty fields;
determine, for each subset of rows of the plurality of subsets of rows, a total number of unique entity instances in the subset of rows; and
present, in the user interface, for each subset of rows of the plurality of subsets of rows, the total number of unique entity instances in the respective subset of rows in association with the one of the overlapping area or the non-overlapping area to which the respective subset of rows corresponds.

11. The computing device of claim 10 wherein the group of entity structures comprises at least three entity structures.

12. The computing device of claim 10 wherein the processor device is further configured to:
determine, for each subset of rows of the plurality of subsets of rows, a total number of unique entity instances in the respective subset of rows for each entity structure in the group of entity structures; and
present, in the user interface, for each subset of rows of the plurality of subsets of rows, the total number of unique entity instances in the respective subset of rows for each entity structure in association with the one of the overlapping area or the non-overlapping area to which the respective subset of rows corresponds.

13. The computing device of claim 10 wherein the processor device is further configured to:

receive, via an input device, a selection of a particular overlapping area or non-overlapping area;
identify the subset of rows associated with the particular overlapping area or non-overlapping area; and
in response to the selection, present, in the user interface, the subset of rows associated with the particular overlapping area or non-overlapping area.

14. The computing device of claim 9 wherein the processor device is further configured to generate the data table that identifies, for the group of entity structures, relationships between the entity instances contained in the group of entity structures.

15. The computing device of claim 9 wherein the objects are circles.

16. A non-transitory computer-readable storage medium comprising a computer program product for presenting data, the computer program product including instructions configured to cause a processor device to:
  access a data table that identifies, for a group of entity structures, relationships between entity instances contained in the group of entity structures, each such relationship identified in a row of the data table, each row containing a plurality of fields, each field in each row corresponding to a different entity structure in the group of entity structures, each field being empty or being non-empty and containing an entity instance identifier of the entity structure to which the field corresponds;
  generate, in a user interface, imagery that depicts a plurality of objects, each object corresponding to a different entity structure of the group of entity structures, each object having a corresponding defined perimeter, wherein the defined perimeter of each object intersects the defined perimeters of each other object to form a plurality of overlapping areas and non-overlapping areas; and
  for each entity structure in the group of entity structures:
    identify a plurality of subsets of rows of the data table, each subset of rows corresponding to a different combination of non-empty fields, each combination of non-empty fields corresponding to one of the overlapping areas or the non-overlapping areas, each subset of rows including those rows of the data table that have the corresponding combination of non-empty fields;
    determine, for each subset of rows of the plurality of subsets of rows, a total number of unique entity instances in the subset of rows; and
    present, in the user interface, for each subset of rows of the plurality of subsets of rows, the total number of unique entity instances in the respective subset of rows in association with the one of the overlapping area or the non-overlapping area to which the respective subset of rows corresponds.

17. The non-transitory computer-readable storage medium of claim 16 wherein the group of entity structures comprises at least three entity structures.

18. The non-transitory computer-readable storage medium of claim 16 wherein the instructions are further configured to cause the processor device to:
  determine, for each subset of rows of the plurality of subsets of rows, a total number of unique entity instances in the respective subset of rows for each entity structure in the group of entity structures; and
  present, in the user interface, for each subset of rows of the plurality of subsets of rows, the total number of unique entity instances in the respective subset of rows for each entity structure in association with the one of the overlapping area or the non-overlapping area to which the respective subset of rows corresponds.

19. The non-transitory computer-readable storage medium of claim 16 wherein the instructions are further configured to cause the processor device to:
  receive, via an input device, a selection of a particular overlapping area or non-overlapping area;
  identify the subset of rows associated with the particular overlapping area or non-overlapping area; and
  in response to the selection, present, in the user interface, the subset of rows associated with the particular overlapping area or non-overlapping area.

\* \* \* \* \*